United States Patent [19]

Laube

[11] Patent Number: 5,295,654
[45] Date of Patent: Mar. 22, 1994

[54] METERING VALVE

[75] Inventor: Daniel J. Laube, Oak Park, Ill.

[73] Assignee: The Chicago Faucet Company, Des Plaines, Ill.

[21] Appl. No.: 24,417

[22] Filed: Mar. 1, 1993

[51] Int. Cl.$^5$ .................. F16K 21/04; F16K 31/48
[52] U.S. Cl. .................. 251/35; 137/245;
137/245.5; 251/39; 251/51
[58] Field of Search ............ 137/242, 244, 245, 245.5;
251/35, 36, 39, 50, 51

[56] References Cited

U.S. PATENT DOCUMENTS

| | | | |
|---|---|---|---|
| 165,190 | 7/1875 | Van Duzer | 251/51 |
| 841,093 | 1/1907 | Mueller et al. | 251/39 |
| 882,740 | 3/1908 | Brooks | 251/36 |
| 1,162,957 | 12/1915 | Watrous | 251/36 |
| 1,254,869 | 1/1918 | Watrous | 251/36 |
| 1,273,140 | 7/1918 | Brooks | 251/36 |
| 1,990,194 | 2/1935 | McNeil | 251/50 |
| 3,400,731 | 9/1968 | McCornack | 251/39 |
| 3,842,857 | 10/1974 | McCornack | 251/51 |
| 4,361,168 | 11/1982 | McCornack | 251/51 |
| 4,899,778 | 2/1990 | Laube | 251/35 |

Primary Examiner—George L. Walton
Attorney, Agent, or Firm—Leydig, Voit & Mayer

[57] ABSTRACT

A metering valve for controlling fluid flow is provided which includes a piston assembly disposed between a fluid inlet and a fluid outlet and mounted for relative movement within a tubular unit between a first open mode, a second open mode connecting the fluid inlet and outlet and a close mode. The assembly is biased to assume the close mode and assumes the first open mode when a predetermined first external form is applied to a valve actuating element forming a component of the metering valve. The assembly assumes the second open mode when the first external force is enhanced by a predetermined second external force applied to the valve actuating element. When the external forces are released, the piston assembly automatically returns to the close mode upon successively moving through first and second segments of travel relative to the tubular unit. The rate of travel during the first segment is substantially less than the rate of travel during the second segment. During the second segment of travel the relative motion of the piston assembly is substantially instantaneous to the close mode. The valve actuating element includes an elongate member having an exposed one end portion on which the predetermined external forces are applied, and a second end portion having a first valve component mounted thereon and actuated to a first open position when the first external force is applied. A second valve component is also mounted on the second end portion of the elongate member and is actuated to a second open position when the second external force is applied.

11 Claims, 1 Drawing Sheet

METERING VALVE

FIELD OF THE INVENTION

The invention relates to a potable water metering valve particularly suitable for use in wash basins, toilets, urinals and the like which are installed in public and commercial buildings, hospitals, factories, schools and churches.

BACKGROUND OF THE INVENTION

The use of metering valves in such installations is widespread and is intended to reduce the amount of water wasted when such valves are actuated. Conservation of water, particularly in certain geographic areas, is of paramount importance where there is a scarcity of water and/or the cost of water is inordinately high.

Various metering valves have heretofore been used for such installations, however, such valves have been beset with one or more of the following shortcomings: a) they are highly susceptible to malfunction; b) they are difficult to service and maintain; c) they are of costly and complex construction; d) they are awkward and difficult to install and require numerous special fittings and the need for special tools; e) replacement of the piston assembly requires substantial disassembly of the valve component; and f) substantial manual force is required to actuate the valve.

While my prior U.S. Pat. No. 4,991,819, dated Feb. 12, 1991, avoids most, if not all, of the foregoing shortcomings, it nevertheless embodies numerous components which increase the initial costs of manufacture and assembly. Furthermore, because of such components, the installer and supplier are frequently required to maintain a large inventory of spare components. Alignment and relative adjustment of the valve components sometimes become a frustrating and time-consuming operation particularly to an untrained installer.

SUMMARY OF THE INVENTION

Thus, an improved metering valve has been provided which is of simple, durable construction, and can be readily installed and serviced with a minimal amount of manual effort.

The improved metering valve may be actuated with a minimal amount of external manual force thereby rendering same readily usable by the elderly and handicapped.

The fluid flow time may be readily adjusted in the improved metering valve with a simple manual operation using a conventional tool, and without requiring shutting off the source of fluid.

The improved metering valve may be readily retrofit with a large number of existing faucets and the like.

Further and additional advantages inherent in the improved metering valve will become apparent from the description, accompanying drawings and appended claims.

In accordance with one embodiment of the invention, an improved metering valve is provided having a piston assembly which is adapted to assume a first open mode upon a predetermined first external force being applied to an elongate, unitary valve actuating means. Pilot operation uses water pressure to assist opening. The piston assembly assumes a second open mode, effecting direct interconnection of a fluid inlet and a fluid outlet, when the first external force is enhanced by a predetermined second external force applied to the valve actuating means. When the external forces are released, the piston assembly automatically assumes a close mode. Upon moving from the second open mode to the close mode, the piston assembly successively moves through first and second segments of travel relative a tubular unit; the latter forming a valve component and disposed between the fluid inlet and outlet. When moving through the travel first segment, the movement of the piston assembly is retarded allowing only a relatively small volume of fluid to flow through the metering valve. During the second segment of travel, the piston assembly moves substantially instantaneously to the close mode halting fluid flow through the valve. One end portion of the valve actuating means is exposed and on it the external forces are applied. The opposite end portion of the actuating means includes a first valve component which is actuated to an open position when the predetermined first external force is applied. A second valve component is also included in the actuating means opposite end portion and is actuated to an open position when the predetermined second external force is applied thereby effecting direct interconnection between the fluid inlet and outlet.

DESCRIPTION OF DRAWINGS

For a more complete understanding of the invention, reference is made to the drawings, wherein.

DESCRIPTION

Figure 1:
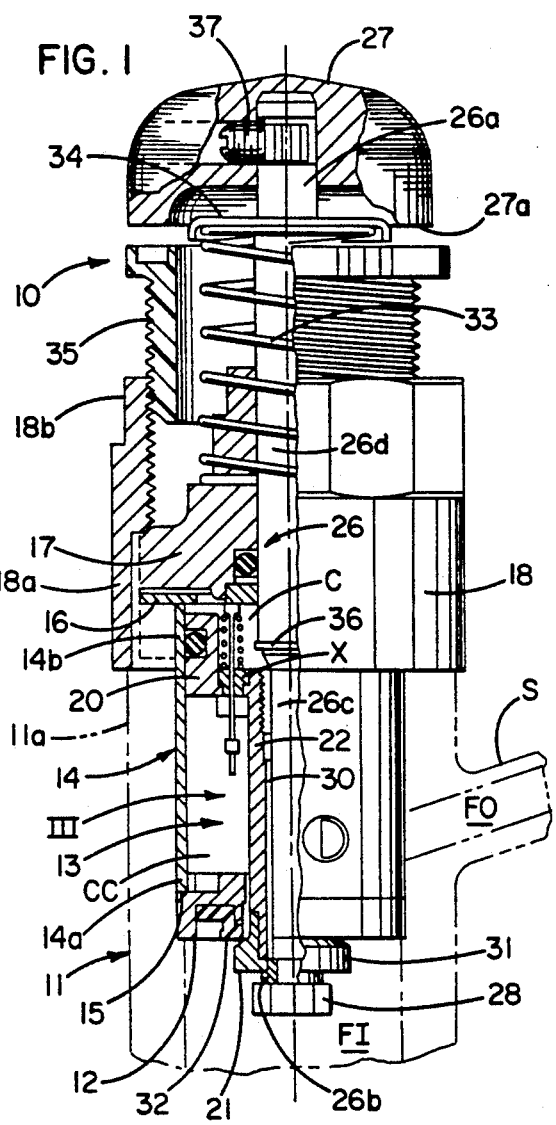
FIG. 1 is a fragmentary side elevational view partially in vertical section of one embodiment of the improved metering valve shown in a close mode.

Referring now to the drawings and more particularly to FIG. 1, one embodiment of the improved metering valve 10 is shown which is suitable for use in wash basins, flush toilets, urinals and like installations provided in public and commercial buildings, hospitals, factories, schools and churches. The improved metering valve is removably mounted within a valve body 11 shown in phantom lines in FIG. 1. The valve body is provided with a fluid inlet FI connected to a source of fluid (water) maintained at a predetermined pressure. The valve body is also provided with a fluid outlet FO which may be in the form of a laterally extending spout S of conventional shape. An internal ledge 12 is formed within the valve body intermediate the inlet and outlet.

Metering valve 10 includes a piston assembly 13 which in turn is slidably mounted within a tubular unit 14, sometimes referred to as a valve sleeve. As seen in FIG. 1, the lower end portion 14a of the unit has pressfit therein a base piece 15 which is in abutting relation with the internal ledge 12 of the valve body 11. The upper, or opposite, end portion 14b of the unit 14 engages a seal washer 16 which is retained in place by a guide piece 17. The outer periphery of the guide piece is engaged by a cap sleeve 18. The lower end portion 18a of sleeve 18 is provided with internal threads which mesh with external threads formed on the upper end portion 11a of the valve body 11. As the cap sleeve 18 is threaded onto the body upper end portion, the seal washer 16 is compressed between the underside of the guide piece 17 and the upper end portion 14b of the tubular unit.

Figure 2:
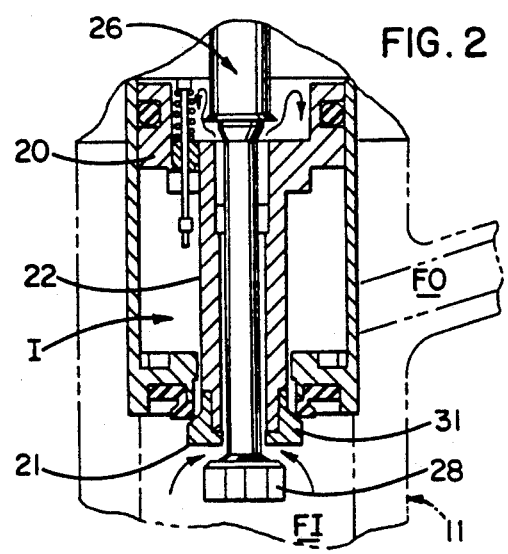
FIG. 2 is a fragmentary vertical sectional diagrammatic view of the valve of FIG. 1 shown in the first open mode.

The piston assembly 13, as seen more clearly in FIG. 2, includes an enlarged upper end portion or head 20, a lower end portion 21, and a tubular center portion 22 which interconnects the end portions. The upper end portion 20 is provided with a peripheral groove in which is disposed an O-ring type seal 23. The upper surface of end portion 20 is counter-sunk and cooperates with the upper end portion 14b of the tubular unit to form a first cavity C which is adapted to accommodate an upper end portion 24a of a spring-biased non-clogging pin 24. The center portion 24b of the pin is loosely mounted within a small metering passage 25 formed on the end portion 20. The underside 20b of the upper end portion 20 of the piston assembly cooperates with the interior surface of the tubular unit 14 and the base piece 15 to form a second cavity CC. The passage 25 effects interconnection between cavities C and CC.

Figure 3:
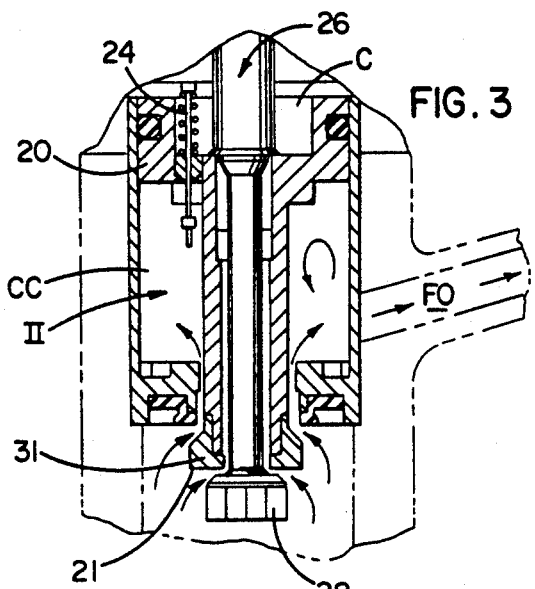
FIG. 3 is similar to FIG. 2 but showing the valve in the second open mode.
Figure 4:
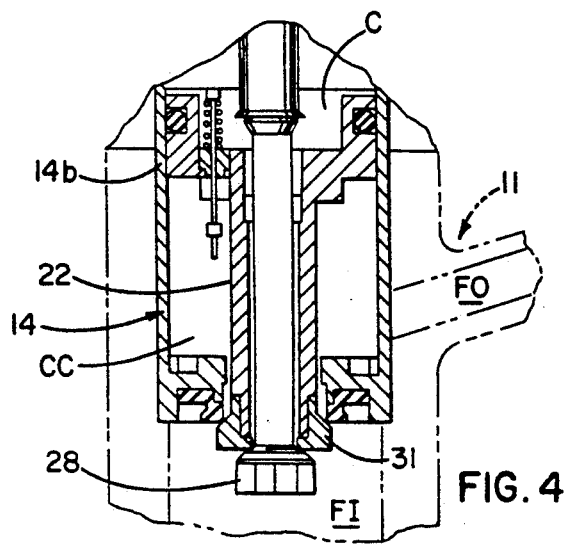
FIG. 4 is similar to FIG. 2 but showing the piston assembly in the first segment of travel relative to the tubular unit.

The piston assembly 13 is mounted for relative longitudinal movement within the tubular unit 14 between a first open mode I (FIG. 2), a second open mode II (FIG. 3); and a close mode III (FIG. 1). The piston assembly 13 is provided with an elongate actuating rod 26 having an exposed upper end portion 26a to which is removably attached a cap piece 27. The lower end portion 26b of the rod projects below the base piece 15 and has mounted thereon a valve component 28. As seen in FIG. 1, the tubular center portion 22 of the piston assembly encompasses a first intermediate portion 26c of rod 26 and cooperates therewith to form therebetween a narrow elongate passage 30.

The lower end portion 21 of the piston assembly has attached thereto an annular valve component 31. The underside of component 31 serves as a valve seat for the valve component 28 mounted on the lower end 26b of rod 26, when the piston assembly assumes the close mode III. The upper surface of component 31 is bevelled and is adapted to sealingly engage a valve seat 32 formed on the underside of base piece 15.

As seen in FIG. 1, a second intermediate portion 26d of rod 26 is encompassed by a bias spring 33. The lower end of spring 33 abuts the upper end portion of guide piece 17 and the upper end of the spring abuts the underside of a washer 34 affixed to the upper end portion 26a of the rod. Thus, spring 33 exerts an upward force on rod 26 urging the piston assembly 13 to assume the close mode III.

Figure 5:
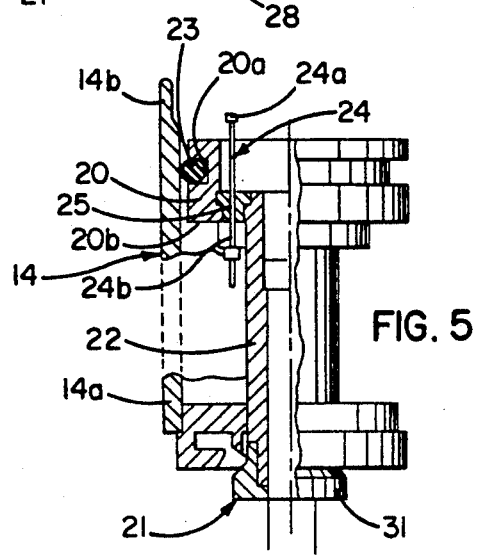
FIG. 5 is a fragmentary, enlarged side elevational view, partially in vertical section of the piston assembly and portions of the tubular unit shown in FIG. 1.

The piston assembly assumes the first open mode I when a first predetermined external downward force is applied to cap piece 27 causing the first valve component 28 to become unseated thereby allowing fluid from the inlet FI to flow up through the narrow passage 30 filling cavity C. The piston assembly assumes the second open mode II, when a second predetermined external downward force is applied to cap piece 27 thereby enhancing the first external force and causing the second valve component 31 to become unseated from valve seat 32. When component 31 is unseated the fluid inlet FI is directly interconnected to the fluid outlet FO. Once the combined first and second external forces are removed from cap piece 27, the piston assembly 13 will automatically return to the close mode upon successively moving through first and second segments of travel relative to the tubular unit 14. As seen in FIG. 5, the upper end portion 14b of unit 14 has an inside diameter which is greater than the inside diameter of the remainder of the unit. Thus, as the piston assembly moves from the second open mode to the close mode, the O-ring seal 23 carried within the peripheral groove 20a of head 20 will slidably and sealingly engage, during the first segment of travel, the interior surface of the tubular unit 14 having the smaller inside diameter. Once, however, the piston assembly has reached the upper end portion 14b of the unit -having the larger inside diameter, the O-ring seal 23 is no longer in sealing engagement with the unit interior surface whereupon due to the force of spring 33 and the fluid pressure exerted on the underside 20b of the head 20, the piston assembly will substantially instantaneously move upwardly through the second segment of travel causing both valve components 28 and 31 to become seated thereby halting fluid flow through the metering valve 10.

The maximum initial displacement of the piston assembly with respect to the tubular unit can be adjusted by an adjustment nut 35, FIG. 1 which is threaded onto the upper end portion 18b of cap sleeve 18. The nut 35 limits the downward movement of the cap piece 27 as the first and second external forces are manually applied thereto. Thus, as the nut 35 is threaded into the cap sleeve a greater amount, the maximum distance that the cap piece 27 can be manually depressed is also increased, thereby increasing the amount by which the piston assembly is initially displaced. A greater initial displacement of the piston assembly increases the length of time during which the piston assembly moves through the first and second segments of travel.

As will be seen in FIG. 1, the interior dimension of actuating rod 26 varies with the first intermediate portion 26c thereof having a smaller diameter than that of the second intermediate portion 26d. At the juncture between the first and second intermediate portions, a snap ring 36 is positioned. The distance X that the snap ring 36 is disposed above the bottom of cavity C, when the piston assembly is in the close mode III, determines the maximum distance the rod 26 must be depressed in order to fully effect unseating of the first valve component 28 while the second valve component remains seated. Once the underside of snap ring 36 engages the bottom of cavity C, further downward external force exerted on cap piece 27 will cause the upper and lower end portions 20 and 21 and the center portion 22 of the piston assembly to move downwardly as a unit unseating the second valve component 31.

Cap piece 27 is secured to the exposed upper end portion 26a of the rod 26 by a conventional socket screw 37. The cap piece in the illustrated embodiment is provided with a depending peripheral flange 27a, which is adapted to abut the upper surface of nut 35 when the second predetermined external force is exerted on the top of the cap piece.

To service the metering valve (i.e. replacing one or both of the valve components 28 and 31) is a simple and expeditious operation. First, the fluid supply connected to the fluid inlet FI of the valve body 11 is shut off. The cap piece 27 is then removed from the upper end portion 26a of rod 26 exposing the upper end of adjustment nut 35. Next, the cap sleeve 18 is unthreaded from the upper end portion 11a of the valve body 11 allowing the rod 26 and piston assembly 13 including tubular unit 14 to be removed as a unitary housing assembly upwardly from the valve body 11. Once the aforementioned housing assembly is removed, the lower end portion 26b of the rod is exposed. As seen in FIG. 1, an assembly the valve component 28 is threaded onto the lower end portion 26b of rod 26. Upon the valve component 28 being removed from the rod end portion 26b, the rod 26 including the guide piece 17 and spring 33 may then be pulled upwardly and disassembled from the remainder of the piston assembly. When this occurs, the second valve component 31 is then exposed and may be replaced if desired.

The size and shape of the various components comprising the improved metering valve may be varied from that shown to accommodate a particular installation. Thus, the improved metering valve effectively reduces wasting of fluid and allows the valve to be readily actuated with a minimum amount of external manual force. The duration of the flow cycle—that is to say the rate of movement the piston assembly through the first segment of travel—may be readily varied without the need for turning off the fluid supply by merely removing the cap piece and then threading or unthreading the adjustment nut 35. No special fittings or tools are required to assemble the improved metering valve on an existing valve body.

I claim:

1. A metering valve for controlling fluid flow between a fluid inlet and fluid outlet, comprising a piston assembly for mounting between the fluid inlet and outlet and for relative movement within a tubular unit having an interior surface first section bore providing sealing engagement with said piston assembly and a second section bore large enough to prevent sealing engagement with said piston assembly; said piston assembly operative in a first open mode, a second open mode and a close mode and being biased to assume a close mode in which said piston assembly is disposed in non-sealing relation with the tubular unit interior surface second section; and an elongate valve actuating member having an exposed one end portion extending from a first end of the tubular unit, a second end portion extending from a second end of the tubular unit and an enlarged section disposed intermediate said end portions; said member second end portion including a first valve component actuated to an open position when a predetermined first external force is applied to said member one end portion, said piston assembly thereby assuming the first open mode in which fluid from said inlet through said first valve component fills a first cavity adjacent said piston assembly toward said tubular unit first end; said piston assembly including a second valve component actuated to an open position upon engagement by said enlarged section when a predetermined second external force is applied to said member one end portion, said piston assembly thereby moving within said tubular unit and assuming the second open mode in which said first cavity fluid volume is increased and said piston assembly is disposed in sealing relation with the tubular unit interior surface first section and direct interconnection between the fluid inlet and outlet is effected; upon the predetermined first and second external forces being released, said piston assembly automatically returning to the close mode upon successively moving through first and second segments of travel relative to said tubular unit; said piston assembly being in sliding sealing engagement with the tubular unit interior surface first section when moving through said first segment of travel whereby movement of said piston assembly is retarded as the fluid in said first cavity is slowly dissipated through a metering port in said piston assembly toward a side of said piston assembly opposite said first cavity, thereby allowing a predetermined volume of fluid to flow through the metering valve, said piston assembly being in a non-sealing relation with the tubular unit interior surface second section when said piston assembly move through the second segment of travel whereby said piston assembly relative motion is substantially instantaneous to the close mode as the fluid in said first cavity is quickly dissipated toward said opposite side between said piston assembly and said tubular unit interior surface second section, thereby halting further fluid flow through the metering valve.

2. The metering valve of claim 1 wherein the piston assembly further comprises a sleeve section disposed in encompassing relation with the elongate member second end portion and cooperating therewith to form a first passageway, a head section disposed at an end of the sleeve section remote from the tubular unit second end and having a periphery thereof in sliding sealing engagement with the tubular unit interior surface first section during the first segment of travel of said piston assembly, said head section cooperating with said tubular unit interior surface and forming said first cavity which is on a first side of the head section adjacent said tubular unit first end and in communication with one end of the first passageway and forming a second cavity disposed on the opposite side of the head section and adapted to be in communication with the fluid outlet, said head section being provided with said metering port communicating with said first and second cavities and regulating fluid flow therebetween upon said piston assembly moving from the second open mode to the close mode.

3. The metering valve of claim 2 wherein the metering port formed in the head section of the piston assembly is provided with an unclogging pin movable independently of said head section during at least a portion of the second segment of travel of said piston assembly relative to the tubular unit.

4. The metering valve of claim 1 wherein the elongate member is of unitary construction.

5. The metering valve of claim 1 wherein the tubular unit forms a part of a housing assembly, the exposed one end portion of the elongate member protruding from said housing assembly in a direction away from the tubular unit first end.

6. The metering valve of claim 5 wherein biasing means is disposed within the housing assembly and effects biasing of said piston assembly to the close mode.

7. The metering valve of claim 4 wherein the housing assembly includes a cap sleeve which is threadably mounted on the tubular unit first end.

8. The metering valve of claim 7 wherein the piston assembly and the elongate member are selectively removable as a unit from said housing assembly.

9. The metering valve of claim 1 wherein the first and second predetermined external forces are applied in a longitudinal direction relative to the elongate member.

10. The metering valve of claim 1 wherein the tubular unit second end is provided with a valve seat for the second valve component of the piston assembly.

11. The metering valve of claim 9 wherein the second valve component forms a valve seat for the first valve component of the elongate member second end portion.

* * * * *